United States Patent [19]

Isaac et al.

[11] Patent Number: 5,613,794
[45] Date of Patent: Mar. 25, 1997

[54] BI-MATERIAL TUBING AND METHOD OF MAKING SAME

[75] Inventors: Timothy S. Isaac, Fo Tan, Hong Kong; Gui Yang, Shenzhen, China; Raymond Lee, Wan Chai, Hong Kong

[73] Assignee: Hong Kong (Link) Bicycles Ltd., Hong Kong, Hong Kong

[21] Appl. No.: 291,426

[22] Filed: Aug. 16, 1994

[51] Int. Cl.$^6$ .................................................. F16B 12/42
[52] U.S. Cl. .......................... 403/265; 403/179; 403/298; 280/281.1; 156/148; 156/158; 156/293; 156/304.5
[58] Field of Search .......................... 280/281.1, 288.3; 403/359, 267, 365, 179, 265, 298; 285/915; 156/148, 158, 172, 304.5, 293

[56] References Cited

U.S. PATENT DOCUMENTS

| | | | |
|---|---|---|---|
| 4,325,647 | 4/1982 | Maier et al. | 403/179 X |
| 4,636,106 | 1/1987 | Waisbrod | 403/298 X |
| 4,657,795 | 4/1987 | Foret | 428/36 |
| 4,721,407 | 1/1988 | Liu | 403/267 X |
| 4,826,346 | 5/1989 | Nishiura et al. | 403/267 |
| 4,828,285 | 5/1989 | Foret et al. | 280/279 |
| 4,850,607 | 7/1989 | Trimble | 280/281.1 |
| 4,900,048 | 2/1990 | Derujinsky | 280/281.1 |
| 4,900,049 | 2/1990 | Tseng | 280/281.1 |
| 4,900,050 | 2/1990 | Bishop et al. | 280/281.1 |
| 4,902,160 | 2/1990 | Jeng | 403/205 |
| 4,902,458 | 2/1990 | Trimble | 264/46.6 |
| 5,013,514 | 5/1991 | Azzani et al. | 264/512 |
| 5,060,961 | 10/1991 | Bontrager | 280/279 |
| 5,076,601 | 12/1991 | Duplessis | 280/281.1 |
| 5,080,385 | 9/1992 | Duplessis | 280/281.1 |
| 5,143,669 | 1/1992 | Mott | 264/103 |
| 5,158,733 | 10/1992 | Trimble | 264/258 |
| 5,160,682 | 11/1992 | Calfee | 264/161 |
| 5,188,384 | 2/1993 | van Raemdonck | 280/281.1 |

FOREIGN PATENT DOCUMENTS

| | | | |
|---|---|---|---|
| 494058 | 6/1950 | Belgium | 280/281.1 |
| 2142171 | 1/1973 | France . | |
| 2444880 | 7/1980 | France . | |
| 2523-541 | 9/1983 | France | 280/281.1 |
| 3-231087 | 10/1991 | Japan | 280/281.1 |
| 687691 | 2/1953 | United Kingdom | 403/365 |
| WO79/00752 | 10/1979 | WIPO . | |

Primary Examiner—Brian L. Johnson
Assistant Examiner—Victor E. Johnson
Attorney, Agent, or Firm—Teresa J. Welch; Stroud, Stroud, Willink, Thompson & Howard

[57] ABSTRACT

The invention provides a bi-material tubing formed of a composite member and a noncomposite member. The tubing has a locking portion where the composite member is secured to the noncomposite member by chemically bonding alone or in combination with mechanical joining techniques. A method of making the tubing is also provided.

2 Claims, 5 Drawing Sheets

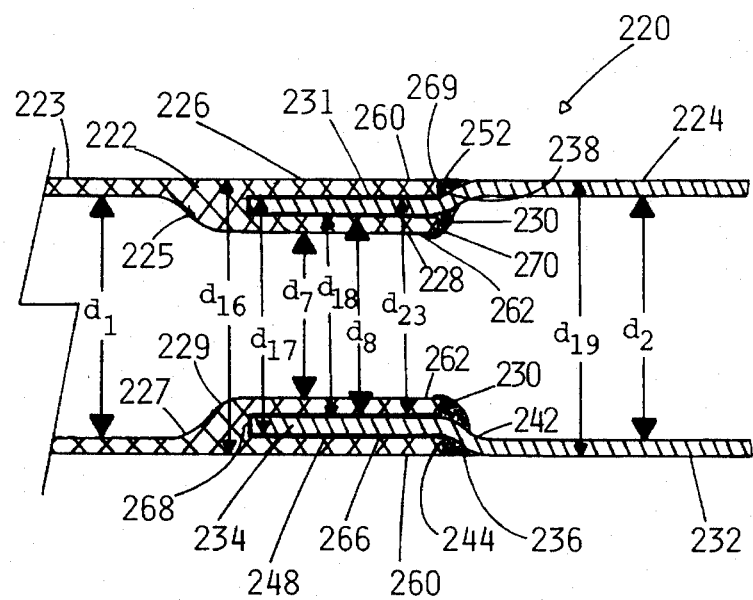
FIG. 7
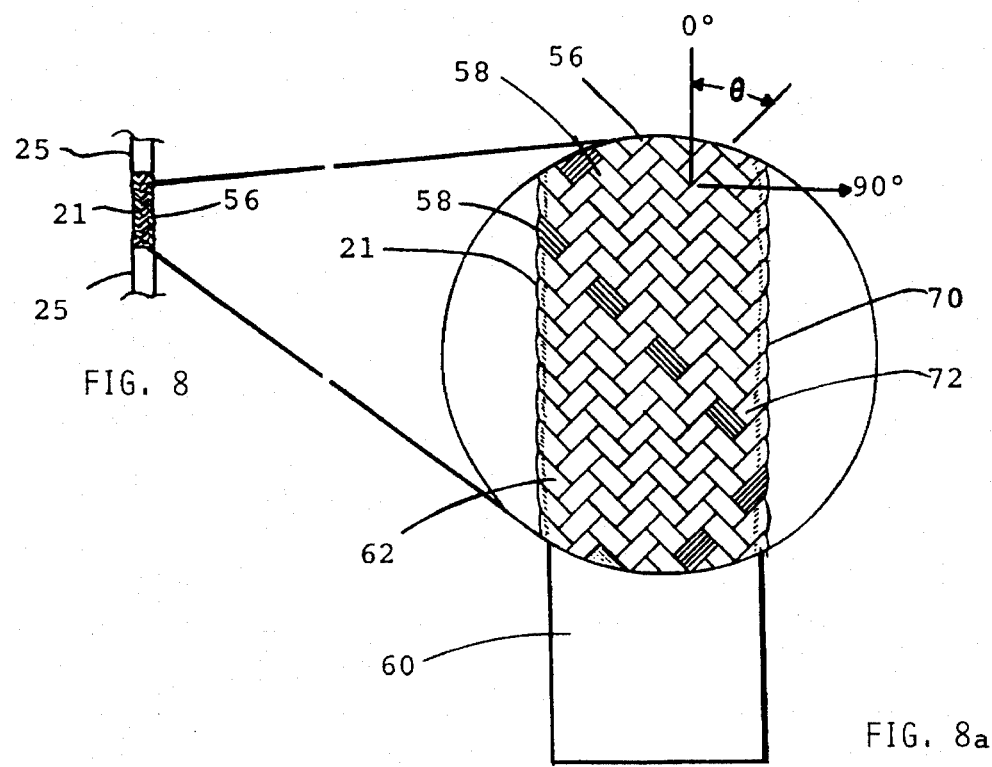
FIG. 8
FIG. 8a

BI-MATERIAL TUBING AND METHOD OF MAKING SAME

TECHNICAL FIELD

This invention relates generally to tubular materials and to methods of making such materials. More particularly, the present invention relates to a lightweight tubing material that is a combination of a composite material, e.g., a reinforced plastic, and a noncomposite material, e.g. a metal, and is well-suited for making bicycle or similar apparatus frames therefrom.

BACKGROUND OF THE INVENTION

Tubular materials have had extensive use as structural components for a variety of apparatuses, for example, bicycle, wheel chair and aircraft frames, and scaffolding. Such tubular materials require high impact and bursting strength, yet are preferably lightweight. Over the years, such tubular structures have been made of any number of different materials, especially metals such as steel and iron, but more recently, in an attempt to reduce weight, aluminum and titanium. Most recently, composite materials have been utilized. Regardless of material choice, however, joining the tubes together is a particularly vexatious problem.

For metal tubular components such as those suitable for bicycle frames, the individual tubular components are secured together by welding, brazing or the like, or bonding into lugs at the tube joints. Steel frames have also been manufactured in "lugless" design, often referred to as fillet-brazed frames. Gussets have also been incorporated into bicycle frames designs. Nonetheless, in each case, welding or brazing is the exclusive method used for joining tubes and gussets, and that method is clearly not employable when composite tubes such as reinforced plastics are used.

All or partial composite tubular structures have been fabricated for, e.g., bicycle frames. As used herein and in the art, a "composite material" is a heterogeneous material which is a combination of two or more chemically distinct and insoluble phases whose properties and structural performance are superior to those of the constituents acting independently; specifically, as used herein, a composite material is created from high-strength fiber reinforcements (the discontinuous or dispersed phase) and an appropriate matrix material, typically, a plastic or polymeric material (the continuous phase). The benefits of using such a material in place of, for example, steel is its greater specific strength (strength-to-weight ratio) than steel.

The most commonly used technique for fabrication of composite material frames is the hand layup method. Sheet-like forms of fiber impregnated with uncured resin (commonly referred to as "prepregs") are applied to a mold of the desired shape or product, and the resin is cured (i.e., the process by which the flexible prepreg is converted from a flexible material in a workable condition into a hardened structural condition).

Besides the use of prepregs, other techniques are known for reinforcing a polymeric matrix. Such techniques include the resin transfer method (RTM). The RTM technique involves use of nonimpregnated fiber sheets or braids which are typically preformed about a mandrel having the configuration of the desired product. The fiber-layered mandrel is placed in a mold and the polymeric resin is injected so that it impregnates the fibers. The use of RTM is described in, e.g., U.S. Pat. No. 4,657,795 issued to Foret for tubular material suitable for a bicycle frame, U.S. Pat. No. 4,828,285 issued to Foret et al. for a bicycle front fork, and U.S. Pat. No. 5,143,669 issued to Mott for construction of a tennis racket.

The bonding of one composite tube to another, however, gives rise to the main difficulty with use of such tubing. Because the fiber-reinforced resin is capable of carrying a tensile stress loading that is many times greater than the resin alone, every seam represents a joint of weakness. To enable transference of stress loadings from fiber to fiber across such seams, the junctures are laminated, i.e., the edge areas of the pieces of prepreg are overlapped. The strength of the composite in such overlapped regions, nonetheless, relies mostly on the adhesive interface in the overlap seam area, and still results in stress concentrations at the junctures and at the exposed fiber ends.

Various approaches to the juncture problem for composite tubing, particularly in the context of bicycle frame construction, have been suggested and are known in the art. For joining tubular components that have already been cured, the components are abutted with each other and an epoxy resin bonding material is applied at the junction formed. Then, one or more prepreg strips are wrapped around the components to tie them together via an adhesive bond that is formed by curing of the prepreg strips. See, e.g., U.S. Pat. No. 4,900,048 issued to Darujinsky; U.S. Pat. No. 5,160,682 issued to Calfee.

Another approach is to form the frame or similar structure using uncured prepreg material. The prepreg materials forming halves of the frame components are laid up in molds along with patches which define the junctions at which the various tubes of the frame are to be incorporated. The entire assemblage is cured and molded at the same time. As a result, the halves of the frame components and the patches all meld into a unified structure. See, e.g., U.S. Pat. Nos. 4,850,607 and 4,902,458 issued to B. J. Trimble where such a technique is applied to the making of bicycle frames. Such frames are known as "monocoque" frames (i.e., "one-piece" frames wherein the frame is molded as a single complete unit). Another approach to increasing the strength of a tubular frame made of composite materials is to eliminate the presence of seams altogether. U.S. Pat. Nos. 5,076,601 and 5,080,385 issued to Duplessis disclose a seamless composite bicycle frame.

Some manufacturers have attempted to bond composite tubing to metal connections to form the tube joints. One approach has involved bonding carbon fiber tubing to cast and machined aluminum alloy connections to form tube joints. Several problems are associated with bonding carbon fiber to aluminum because the two different materials have extremely different structural properties. For example, the coefficients of thermal expansion and the fatigue characteristics of the two materials are substantially different, both of which increase the potential for failure to occur at the connections. Also, the modulus of elasticity of aluminum is substantially lower than that of most composite materials, including commonly used carbon fiber materials. This means that relatively large, bulky connectors, or lugs, are required to provide the needed strength, at the cost of adding weight to the frame being constructed. There is also a difference in the galvanic corrosion potentials between the two materials, sometimes leading to corrosion of the aluminum.

Another approach has been to use an alloy other than aluminum alloy as the metal connector for composite tubing. U.S. Pat. No. 4,902,160 issued to Jeng describes a chromium-molybdenum connector for receiving tubular composites wherein the joint is covered with a coating of the same composite material of which the tubing is made. It is not clear whether such an approach eliminates the problems associated with aluminum connectors.

There are, thus, many practical design problems associated with the use of composite tubular materials as structural components. To date, the art has not adequately responded with the introduction of a tubing that both utilizes the lightweight, high strength-to-weight properties of composites, yet can use conventional, low-cost joining technologies.

SUMMARY OF THE INVENTION

The present invention provides a tubing material made of at least two different members that are different structural materials. The two members are joined together in a hi-material lock whose strength is heretofore unheralded in the art. One member of the tubing in accordance with the present invention is typically a composite material, taking advantage of the strength, lightweight and flexibility of such a material. The other member is typically a metal or metal alloy, taking advantage of the conventional and low cost joining technology associated with metal tubing. Thus, the present invention provides advantages beyond those of either member individually.

The foregoing, and other advantages of the present invention, are realized in one aspect thereof in a lightweight tubing material, comprising a composite tubular member, a noncomposite tubular member and a locking portion therebetween the composite member and the noncomposite member. The composite member includes at least one braided tubular layer of resin-reinforced fibers, and has a main portion and an end portion. The main portion of the composite member has a first inside diameter and the end portion has an inner surface.

The noncomposite member, typically steel, includes a main portion, a laterally extending insert end portion and a neck portion therebetween. The insert portion of the noncomposite member has an outer surface and a second inside diameter. The second diameter is less than the first diameter. The neck portion of the noncomposite member has one end adjacent the main portion and another end adjacent the insert portion, and has a linearly decreasing inside diameter spanning from the main portion to the insert portion. The main noncomposite portion has an inside diameter substantially equal to the first diameter.

The locking portion includes the end composite portion, the insert noncomposite portion and an adhesive layer therebetween. The end composite portion is dimensioned and configured for being sleeved on the insert portion. The adhesive layer adheres the insert noncomposite portion to the end composite portion. The insert portion has an outer surface and an inside diameter that linearly increases from the neck portion to the end surface.

In another aspect, the invention includes a spline disposed between the inner surface of the end portion of the composite member and the outer surface of the insert portion of the noncomposite member. The spline is substantially tubular and has an inner surface and an outer surface. The inside diameter of the insert portion of the noncomposite member is substantially the same from one end to the other. The adhesive layer adheres the outer surface of the spline to the inner surface of the end portion of the composite member and adheres the inner surface of the spline to the outer surface of the insert portion of the noncomposite member. The spline includes axially-extending projections on the inner surface and the outer surface. The projections on the inner surface are alternately disposed relative to the projections on the outer surface.

In a further aspect, the invention includes a tubing material wherein the end portion of the composite member has an inside diameter smaller than the first diameter, has a substantially flat end surface and has an annular groove in the end surface. The annular groove is configured and dimensioned to receive the insert portion of the noncomposite member. The adhesive layer adheres the insert portion of the noncomposite member to the groove and the neck portion of the noncomposite member to the end surface.

The fibers of the braided tubular layer are triaxially braided yarns or biaxially braided yarns.

In a still further aspect, the invention provides a method of making a tubing material. The method includes the steps of: (a) forming a first tube constructed of at least one braided tubular layer of resin-reinforced fibers disposed around a tubular core, and having an end portion; (b) forming a second tube constructed of a tubular lightweight metal alloy material, and having an insert portion extending laterally from a main portion; (c) applying adhesive to the inner surface of the end portion and to the outer surface of the insert portion; (d) inserting the insert portion of the second tube into the end portion of the first tube; and (e) securing the end portion to the insert portion. Step (a) includes braiding triaxially or biaxially uncured fibers onto the tubular core to form a tubular preform; and then impregnating the fibers with a resin under pressure and at a temperature sufficient to cure the resin. The core is preferably constructed of a steel or a polyurethane.

The invention also provides a bicycle or similar vehicle frame including a number of interconnected tubular members made of the tubing material in accordance with the present invention. This frame constitutes another aspect of the invention.

Other advantages and a fuller appreciation of the specific adaptations, compositional variations, and physical attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which:

FIG. 7 is a schematic sectional view of a third embodiment of the tubing in accordance with the present invention;

FIG. 8 is a schematic enlarged plan view of the braided composite member of the tubing in accordance with the present invention.

DETAILED DESCRIPTION

Figure 1:
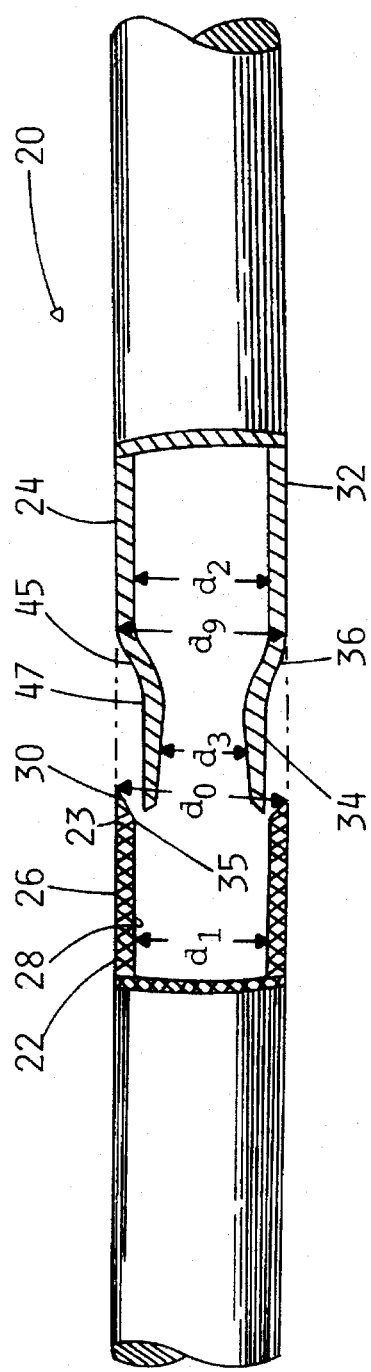
FIG. 1 is an exploded, partially sectional view of one embodiment of a tube in accordance with the present invention.

The present invention relates broadly to tubular materials. However, the present invention is well-suited as a structural component for use, e.g., in construction of lightweight bicycle frames. Accordingly, the present invention will now be described in detail using the construction of bicycle frames as illustrative of the use of the present invention; however, those skilled in the art will appreciate that such a description of the invention is meant to be exemplary only and should not be viewed as limitative on the full scope thereof.

The present invention provides a tubing that includes both composite, typically fiber-reinforced plastic, and noncomposite, typically metallic, members. The composite member is preferably of greater length than the noncomposite member, the noncomposite member being joined to one or both ends of the composite member. The present invention is thus characterized by being lightweight, yet capable of joining members with varied mechanical and physical properties to form a tube. Where the noncomposite material is metallic, tubes can be joined using conventional joining technology such as welding. These attributes are achieved through a novel combination of physical, mechanical and compositional elements.

Reference is initially made to FIGS. 1–7 wherein a tubing in accordance with the present invention is depicted and generally designated as 20. Tubing 20 includes a first tubular member 22 and at least one second tubular member 24. As best seen in FIG. 2a, first member 22 may be joined with member 24 at both ends, thereby forming a tube having, for example, a composite midsection 21 and metallic ends 25. Generally, first tubular member 22 includes an end portion 26 which has an inner surface 28. End portion 26 has outer surface 23 and an end portion outer diameter $d_0$. Inner surface 28 is suitably beveled. End portion 26 also has an end surface 30 that is substantially inwardly sloping. Member 22 including end portion 26 has an inside diameter $d_1$, which may be suitably about 10 to 50 mm.

Second tubular member 24 is affixed to the end of first tubular member 22 so that it constitutes an end of tube 20. Second tubular member 24 includes a main tubular portion 32, an insert portion 34 which extends laterally from main portion 32, and a neck portion 36 therebetween. Main portion 32 has an inside diameter $d_2$. A typical value of $d_2$ is 10 mm to 50 mm. Main portion 32 has a main portion outer diameter $d_3$ substantially equal to the outer diameter $d_0$ of the end portion 26. Insert portion 34 has an inside diameter $d_3$ that is generally smaller than $d_2$.

Figure 2:
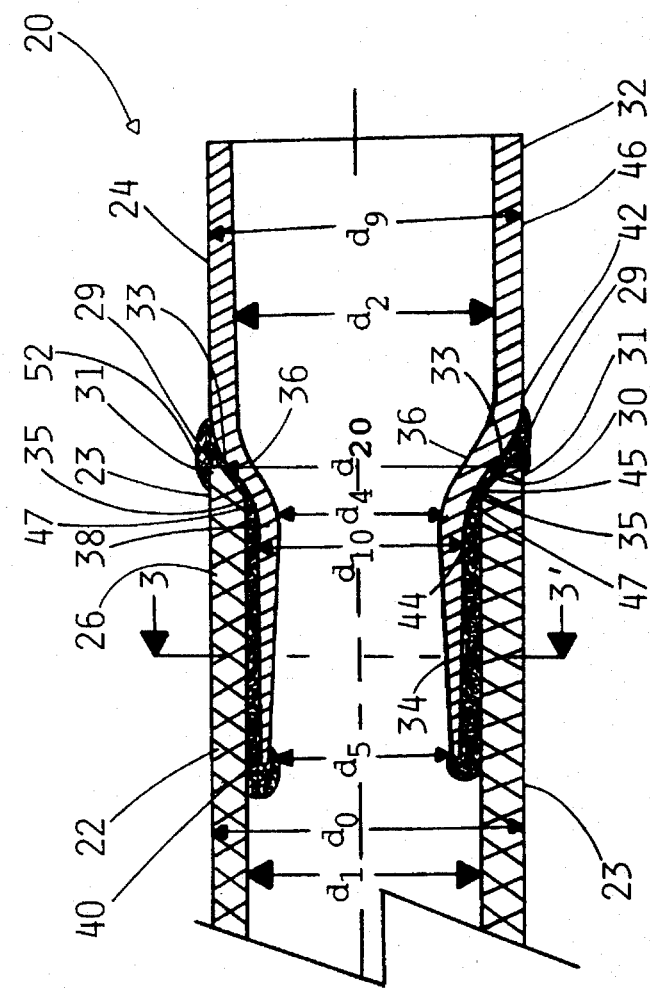
FIG. 2 is a schematic longitudinal sectional view of the embodiment of FIG. 1.
Figure 2A:
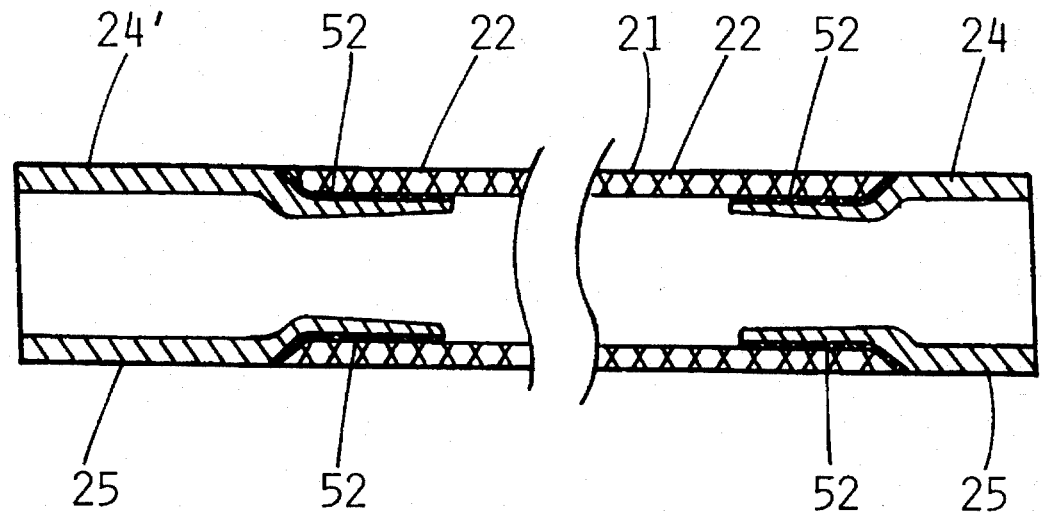
FIG. 2a is a schematic sectional view similar to FIG. 2 illustrating a composite tube with noncomposite tubes joined on either end.

As best shown in first embodiment, FIG. 2, end portion 26 has an outer corner 31, a first inner corner 33 and a second inner corner 35. Outer corner 31 is squared with respect to the outer surface 23 of end portion 26 forming a generally perpendicular annular surface 29 between outer corner 31 and first inner corner 33. End surface 30 is formed between the first inner corner 33 and the second inner corner 35. End 30 slopes substantially inwardly from an inside diameter $d_{20}$ at first inner corner 33 to inside diameter $d_1$ at the second inner corner 35 where diameter $d_{20}$ is greater than $d_1$.

Figure 3:
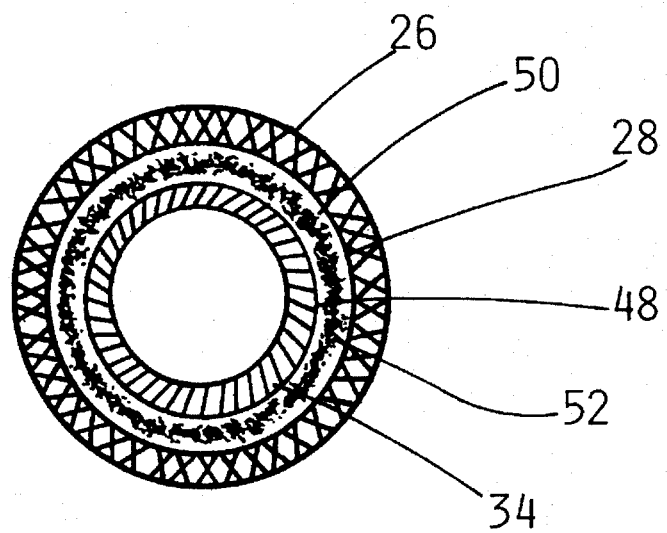
FIG. 3 is a schematic cross-sectional view along line 3-3' of FIG. 2.

In a first embodiment, best seen in FIGS. 2, 2a and 3, one end 38 of insert portion 34, adjacent neck portion 36, has an inside diameter $d_4$ and at the other end 40 has an inside diameter $d_5$, wherein $d_5$ is generally greater than $d_4$. Neck portion 36 has one end 42 adjacent main portion 32 and another end 44 adjacent insert portion 34. Neck portion 36 end 42 with outer diameter $d_9$ is bent in a convex orientation. Other end 44 of neck 36 with outer diameter $d_{10}$ is bent concavely having concave bend 47. Neck portion 36 has a variable inside diameter that decreases from $d_2$ to $d_4$ and a corresponding variable decreasing neck outer diameter that decreased at end 42 from main portion outer diameter $d_9$ to an insert portion outer diameter $d_{10}$ at end 44 of neck 36. Main portion 32 has an outer surface 46. Insert portion 34 has a constant outer diameter $d_{10}$ which is smaller than the end portion 26 inside diameter $d_1$. The variable decreasing neck outer diameter forms an inwardly sloping neck outer surface 45 suitably dimensioned to abut against and mate with the end surface 30 of end portion 26 when the tubular members 22 and 24 are affixed.

As best seen in schematic cross-section in FIG. 3, tubular insert end portion 34 has an outer surface 48. The interface 50 between outer surface 48 of insert portion 34 and the inner surface 28 and end surface 30 of end portion 26 is covered with an adhesive layer 52 to adhesively join portions 26 and 34. As shown in FIG. 2, end surface 30 is joined with neck outer surface 45. The bonding surface is suitably about 20 mm to about 50 mm in length. Second inner corner 35 of end portion 26 is abuttingly positioned in the concave bend 47 of neck portion 36 with edge 30 abutted against neck outer surface 45.

Figure 4:
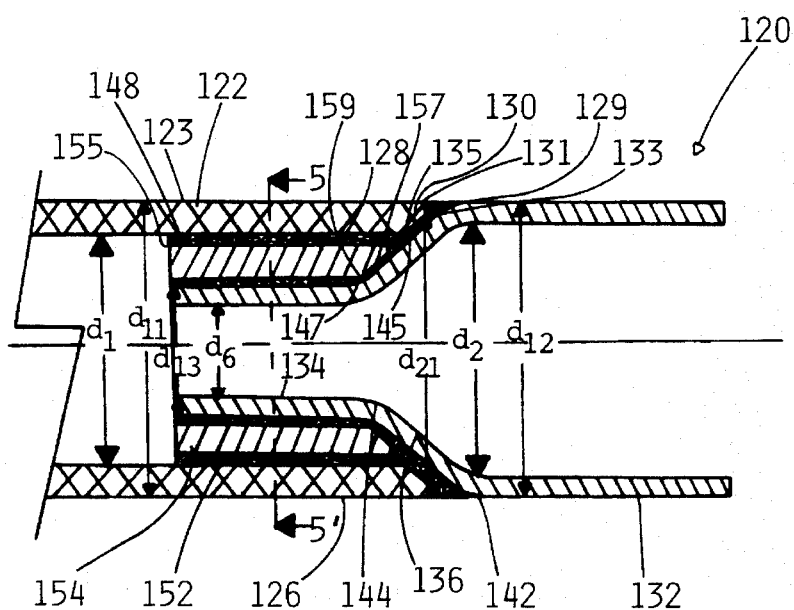
FIG. 4 is a schematic sectional view of a second embodiment of the tubing in accordance with the present invention.
Figure 5:
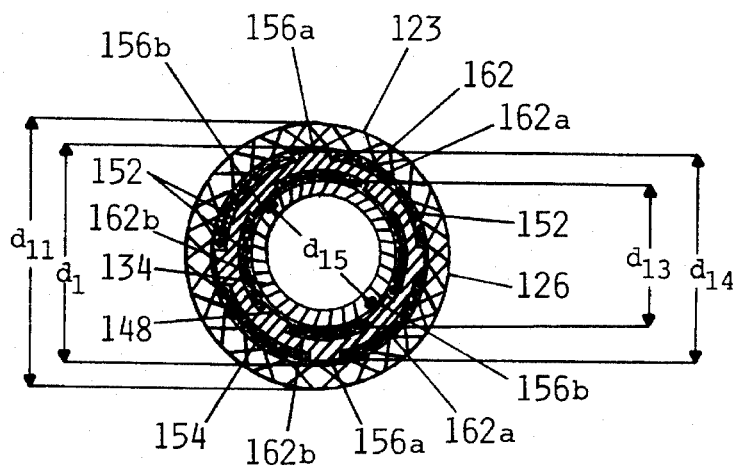
FIG. 5 is a schematic cross-sectional view along line 5-5' of FIG. 4.
Figure 6:
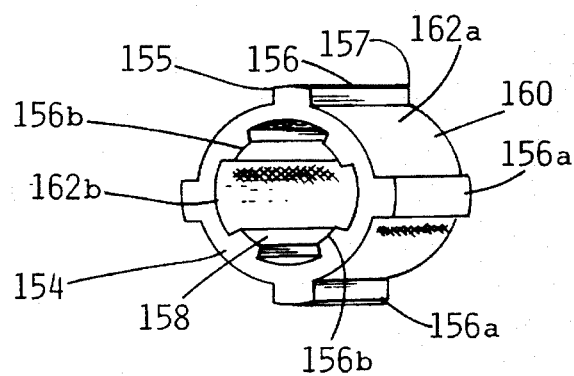
FIG. 6 is a perspective view of the spline used in accordance with embodiment depicted in FIG. 4.

A second embodiment of the present invention is illustrated in FIGS. 4–6. A tubing 120 includes a first member 122 and at least one second member 124. First tubular member 122 includes an end portion 126 which has an inner surface 128 as described hereinbefore for the embodiment of FIG. 2. End portion 126 also has an end surface 130 that is substantially inwardly sloping. Member 122 including end portion 126 has an inside diameter $d_1$. As best shown in FIGS. 4 & 5, end portion 126 has an outer surface 123 and an end portion outer diameter $d_{11}$. As is best shown in FIG. 4, end portion 126 has an outer corner 131, a first inner corner 133 and a second inner corner 135. Outer corner 131 is squared with respect to the outer surface 123 of end portion 126 forming a generally perpendicular annular surface 129 between outer corner 131 and first inner corner 133. An angled surface 130 is formed between the first inner corner 133 and the second inner corner 135. The angled surface 130 slopes substantially inwardly from an inside diameter $d_{21}$ at first inner corner 133 to inside diameter $d_1$ at the second inner corner 135.

Second tubular member 124 is affixed to the end of first tubular member 122. Second tubular member 124 includes a main tubular portion 132, an insert portion 134 which extends laterally from main portion 132, and a neck portion 136 therebetween. Main portion 132 has an inside diameter $d_2$ and an outer diameter $d_2$ substantially equal in dimension to the outer diameter $d_2$ of the end portion 126. Insert portion 134 has a uniform inside diameter that is generally smaller than $d_2$ and is designated $d_6$. Neck portion 136 has one end 142 adjacent main portion 132 and another end 144 adjacent insert portion 134. Neck portion 136 has a variable inside diameter that decreases from $d_2$ to $d_6$ and a corresponding decreasing neck portion outer diameter which decreases from outer diameter $d_{12}$ to outer diameter $d_{13}$, where outer diameter $d_{13}$ is smaller than the end portion inside diameter $d_1$. The variably decreasing neck portion outer diameter forms an inwardly sloping neck surface 145 dimensioned to partially mate with the end surface 130. Neck portion 136 end 142 with outer diameter $d_{12}$ is bent in a convex orientation. Other end 144 of neck portion 136 having outer diameter $d_{13}$ is bent in a concave orientation having concave bend 147. Tubular insert portion 134 has an outer surface 148 Included between inner surface 128 and outer surface 148 Insert portion 134 has constant outer diameter $d_{13}$ is a spline 154 having uniform projections 156 on its inner surface 158 and outer surface 160, as best seen in FIG. 6. Projections 156a extend from spline outer surface 160 toward inner surface 128 and projections 156b extend from spline inner surface 158 toward outer surface 148. The distance between projections 156 defines a uniform gap 162. Gaps 162a are defined on outer surface 160 while gaps 162b are defined on inner surface 158. An adhesive layer 152 fills each gap 162 to bond first member 122 to second member 124. The spline 154 has a spline outer surface diameter $d_{15}$ (from projection 156a to an opposite projection 156a) which is smaller than the end portion 126 inside diameter $d_1$. The spline 154 has an inside surface diameter $d_{14}$ from a projection 156b to an opposite projection 156b. Diameter $d_{15}$ is greater than the insert portion outer surface diameter $d_{13}$. As best shown in FIG. 4, the spline has two ends 155 and 157. Spline end 157 is suitably angled and dimensioned to permit abutment against inwardly sloping neck surface 145. End surface 130 and spline angled end 157 are together suitably dimensioned to abut against inwardly sloping neck surface 145 with a portion 159 of angled end 157 nesting in concave bend 147 of neck 136.

A third embodiment of the present invention is illustrated in FIG. 7. A tubing 220 includes a first member 222 and at least one second member 224. First tubular member 222 includes a main tubular portion 223, an end portion 226, and a neck portion 225 therebetween. End portion 226 has an inner surface 228. Main tubular portion 223 has an inside diameter of $d_1$ and end portion 226 has an inside diameter of $d_7$. Neck portion 225 has one end 227 adjacent main portion 223 and another end 229 adjacent end portion 226. Neck portion 225 has a variable inside diameter that decreases from $d_1$ to $d_7$. End portion 226 also has a bifurcated end surface 230. The end portion 226 bifurcates into an outer end portion 260 and an inner end portion 262. The outer end portion 260 and the inner end portion 262 are disposed in a parallel spaced relationship with an annular groove 231 therebetween. The outer end portion 260 has an end surface 269 and outer diameter $d_{16}$ and inside diameter $d_{17}$. The inner end portion 262 has an end surface 270, an outer diameter $d_{18}$ and inside diameter $d_7$. Collectively end surfaces 269 and 270 make up bifurcated end surface 230.

Second tubular member 224 is affixed to the end of first tubular member 222. Second tubular member 224 includes a main tubular portion 232, an insert portion 234 which extends laterally from main portion 232, and a second table neck portion 236 therebetween. Main portion 232 has an inside diameter $d_2$ and an outer diameter $d_{19}$ which is substantially equal to the outer end portion outer diameter $d_{16}$. Insert portion 234 has a uniform inside diameter that is generally smaller than $d_2$ and is designated $d_8$. Second table neck portion 236 has one end 242 adjacent main portion 232 and another end 244 adjacent insert portion 234. Second table neck portion 236 has a variable inside diameter that decreases from $d_2$ to $d_8$ and a variable decreasing second tube neck portion outer diameter decreasing from diameter $d_{19}$ to a final dimension smaller than the outer end portion inside diameter $d_{17}$. The variable decreasing second tube neck portion outer diameter forms an inwardly sloping second tube neck surface 238 dimensioned to abut with the end surface 269 of the outer end portion 260. Tubular insert portion 234 has an outer surface 248. The insert portion 234 outer surface 248 has an outer diameter $d_{23}$ smaller than the outer end portion 260 inside diameter $d_{17}$. Inner diameter $d_8$ of insert portion 234 is greater than the inner end portion 262 outer diameter $d_{18}$. End portion 226 of first member 222 includes an annular groove 231 in end surface 230 configured to complement and receive insert portion 234 of second member 224. The annular groove 231 has a length 266 and width 268 suitably dimensioned for accepting insert portion 234 of the second member 224. An adhesive layer 252 is placed in groove 231 and bonds insert portion 234 to end portion 226.

The first tubular member 22 (or 122 or 222) of tube 20 (or 120 or 220) is suitably constructed of a composite material which is a fiber reinforced resin, i.e., a fiber impregnated with a thermosetting, thermoplastic or other hardening agent, e.g., epoxy or polyester. The fiber material is suitably fibers of carbon, aramid, glass, boron, silicon carbide, or a polyethylene fiber such as Sprectra™, or any other type of fiber presenting appropriate mechanical characteristics, or combinations thereof, as well as any other type of resin.

The second tubular members 24 (or 124 or 224) of tube 20 (or 120 or 220) are suitably constructed of noncomposite materials, for example, metallic materials, such as aluminum alloy, steel, titanium, etc. Noncomposite materials are selected according to strength, weight and other considerations. For example, 4130 steel and titanium 3/2.5 V are used for desirable mechanical properties such as a tensile strength above 100,000 psi, ductility and hardness.

Tubes 20 with metallic members 24 may thus be joined by welding, brazing or other metal joining technology.

Tube 20 (or 120 or 220) with two metallic members 24, one on each end, provides a tubing with a midsection that is lightweight, of high strength and flexible, and end sections that are amenable to conventional joining methods that are low cost and highly reliable.

Spline 154 is suitably constructed of braided fibers and cured resin or short fibers and cured resin.

Adhesive layer 52 (or 152 or 252) is suitably formed with a one- or two-part self-curing or heat cured structural adhesive, e.g., 3M DP-460 Epoxy Adhesive.

It has been found that first member 22 (or 122 or 222) is advantageous a tubular braided composite. Braiding of the tubular structure involves forming an array of yarns extending substantially parallel to the axis of the tubular structure to be formed and interlacing of two or more systems of yarns in the bias direction. As best seen schematically in FIG. 8, the textile fibers of first member 22 of tube 20 (or 122 or 222) are suitably constituted as braided tubes 56 of yarns 58. Yarns 58 are suitably braided biaxially or triaxially, preferably triaxially, having a braiding angle that is 45°. The braided composite has a density (fiber to resin volume ratio) of about 45% to about 60%, tensile strength of about 47.8 Ksi (330 MPa), and a compressive strength of about 58 Ksi (400 MPa), and a bending strength of about 5.2 Msi (32 GPa).

A first member 22 (or 122 or 222) of this type is made in accordance with a process which also constitutes part of the present invention. Such a process involves braiding, before molding, a textile structure around a core having the shape of the final first member 22 (or 122 or 222) and in which the yarns are positioned in a manner set forth hereinafter, impregnating the yarns with resin, and molding the structure using, for example, a modified resin transfer method.

Braided tubes 56 are suitably formed by a braiding technique that is known in the art. The braiding technique involves pulling a core member 60 having the configuration of first member 22 (or 122 or 222) and being of slightly smaller dimensions in order to take into account the thickness of the textile reinforcement which will be disposed therearound, along the center line or axis of a multi-spindle braiding machine, while braiding a layer of nonimpregnated yarns 62 therearound to form a preform 61. The braiding of tube 56 onto core member 60 ensures an extremely tight fit therebetween, so that the braid and core member form an almost integral structure with significantly greater integration between the braid and the core member than can be achieved by simply inserting the latter into the former after braiding because of fiber yarn tension.

The first member 22 (or 122 or 222) of tube 20 (or 120 or 220) is suitably fabricated from tube 56 by a modified resin transfer method. Preform 61 of braided yarn and core as described hereinabove is introduced into a mold which has the final dimension of the member 22 (or 122 or 222) and wherein the molding operation is carried out. The walls of the mold cavity can be previously sprayed with a releasing agent to facilitate release of the molded product as is well known in the art. The mold is then closed and presses are used to hold the mold closed. The resin, for example, epoxy, is heated to a temperature of about 180° C. and pressurized to a pressure of about 80 psi using heated resin pumps. A negative internal pressure is provided in the mold by a vacuum pump as the resin is pumped into the mold. Once the resin is pumped into the mold, the temperature is raised to about 170° C. to about 180° C., depending on the resin used, to cure or harden the resin. The resin typically sets in about 30 minutes and the mold can then be opened. The resulting molded first member 22 requires little or no further surface finishing to enhance its appearance.

The core member 60 is preferably a solid steel material. A foamed polymeric material, for example, preferably polyurethane, is also suitably used.

Molded member 22 (or 122 or 222) has a wall thickness of about 1.5 mm to about 2.0 mm depending on the type of tubing to be constructed and its application.

Many modifications can be made to the abovedescribed method of making first member 22 (or 122 or 222). For example, it is contemplated that a "lost core" method, such as that described in U.S. Pat. No. 5,013,514 issued to Azzani et al. may also be used.

It has been found that certain compositions of braided member 22 (or 122 or 222) achieve certain desirable mechanical properties. For example, a highly desirable composite material composition has been formed to include 40–100% carbon fibers, up to 10% Kevlar™ fibers, and up to 50% fiberglass. Specifically, a blend of 90–95% carbon fiber and 5–10% Kevlar™ has been found to have enhanced toughness. A blend of 40–45% carbon fiber, 5–10% Kevlar™ and 50% fiberglass has been found to be of equal mechanical properties, providing substantial cost savings but with increased weight. Thus, tube 20 made with first member 22 may have varied properties depending upon the fiber blend suitable for a particular application, for example, for a particular type of bicycle frame.

Second members 24 (or 124 or 224) which are metallic tubes are made by methods known per se in the art.

Once members 22 (or 122 or 222) and 24 (or 124 or 224) are constructed, a layer of adhesive 52 (or 152 or 252) is then placed on the outer surface 48 of insert portion 34 (or 234), and insert portion 34 (or 234) is inserted into end portion 26 (or 226) of first member 22 (or 222). Members 22 (or 122) and 24 are thus tightly abutted so that the outer surfaces of member 22 and member 24 are adjoined to form a smooth interface 64. In the case of the second embodiment that employs the use of a spline, the adhesive layer 152 suitably has an alternating pattern, by filling gaps 162.

Figure 9:
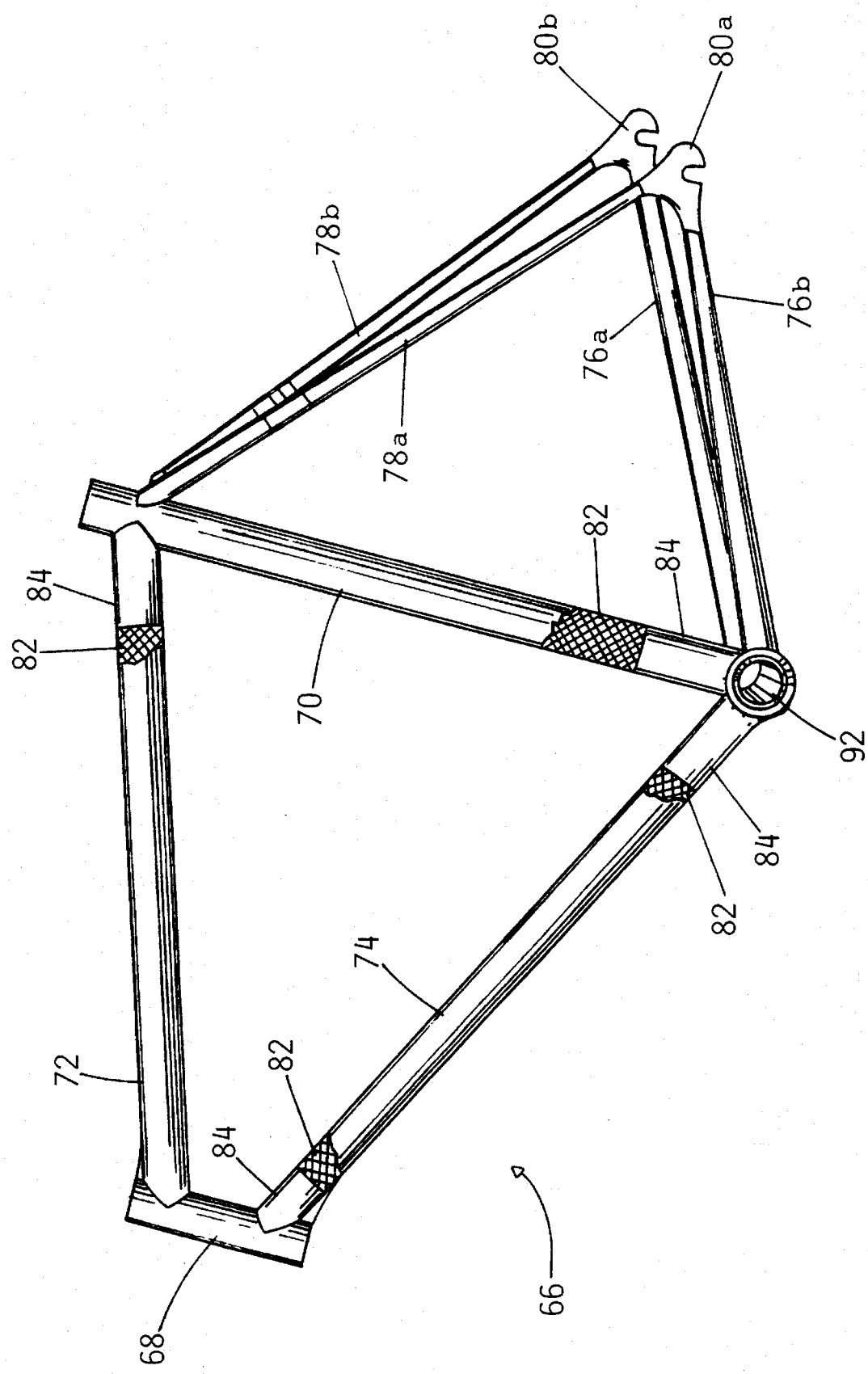
FIG. 9 is a bicycle frame built according to the present invention with partial cut away tubular sections.

Reference is now made to FIG. 9, illustrating a typical bicycle frame 66 built with tubing 20 according to the present invention. The frame 66 consists of a head tube 68, a seat tube 70, a top tube 72, a down tube 74, two chain stays 76a and 76b, two seat stays 78a and 78b, two rear drop-outs 80a and 80b and crank axle bracket 92. This is essentially the arrangement of a traditional bicycle frame. It will be appreciated that fewer or greater numbers of tubes and different tubes connections are possible, where appropriate, and such alternate arrangements are not excluded by any aspect of the invention.

Each of the tubes 68, 70, 72, 74, 76, 78 and 80 includes a composite midsection portion 82 and metallic portion 84, one at either end of portion 82. The tubes are thus joined by brazing using conventional techniques. Generally, each of the tubes 20 of frame 66 is a longitudinal member having an annular cross sectional shape. In appropriate circumstances, however, the tube 20 may be of oval, tear-drop or other selected cross sectional shape, with the exception that certain components such as head tube 68 and axle bracket 82, must have a cylindrical void extending through their internal length to receive rotating members.

In summary, the present invention provides lightweight tubing useful for constructing a bicycle frame or the like. The tubing is constructed in major part of a composite material, giving it lightweightness. However, the end members of the tubing are of a noncomposite material such as a metal or metal alloy, thereby permitting conventional methods of joining tubing to be used. As such, a bicycle frame or the like so constructed is lightweight similar to an all composite frame yet with a cost that is about 25% to about 30% of an all composite frame.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

We claim:

1. A lightweight tubing material, comprising a composite tubular member, a noncomposite tubular member, a locking portion therebetween said composite member and said noncomposite member and a spline:

said composite member including at least one braided tubular layer of fibers reinforced with a resin, and having a main composite portion and an end composite portion, said main composite portion having a first inside diameter, said end composite portion having an outer corner, a first outer diameter across said outer corner, a first inner corner, a second inner corner, said first inside diameter extending across said second inner corner, an annular surface extending between said outer corner and said first inner corner, a substantially inwardly sloping end surface extending between said first inner corner and said second inner corner, and an inner surface;

said noncomposite member including a main noncomposite portion, a neck noncomposite portion and an insert end noncomposite portion, said neck noncomposite portion therebetween said main noncomposite portion and said insert end noncomposite portion, said insert end noncomposite portion laterally extending from said neck noncomposite portion, and having an outer surface, an insert portion outer diameter and a second inside diameter, said second inside diameter being less than said first inside diameter, said main noncomposite portion having a main noncomposite portion outer diameter substantially equal to said first outer diameter, said neck noncomposite portion having one convexly bent end adjacent said main noncomposite portion and another concavely bent end adjacent said insert end noncomposite portion, and having a linearly decreasing inside diameter spanning from said main noncomposite portion to said insert end noncomposite portion, said neck noncomposite portion having a corresponding linearly decreasing outer diameter spanning from said main noncomposite portion outer diameter to said insert portion outer diameter, said main noncomposite portion having an inside diameter substantially equal to said first inside diameter; said locking portion including said end composite portion, said insert end noncomposite portion and an adhesive layer therebetween; said second outer corner and said end surface of said end composite portion abutting said neck noncomposite portion; said adhesive layer adhering both said insert end noncomposite portion and said neck noncomposite portion to said end composite portion; and said spline disposed between said inner surface of said end composite portion of said composite member and said outer surface of said insert end noncomposite portion of said noncomposite member, said spline being substantially tubular and having an inner surface and an outer surface, said adhesive layer adhering said outer surface of said spline to said inner surface of said end composite portion of said composite member and adhering said inner surface of said spline to said outer surface of said insert end noncomposite portion of said noncomposite member and wherein said second inner corner and said end surface of said end composite portion are adhered to said neck noncomposite portion by said adhesive layer.

2. The tubing material of claim 1, wherein said spline includes axially-extending projections on said inner surface and said outer surface, said projections on said inner surface being alternately disposed relative to said projections on said outer surface.

* * * * *